US008040216B2

(12) United States Patent
Jordan et al.

(10) Patent No.: US 8,040,216 B2
(45) Date of Patent: Oct. 18, 2011

(54) VIRTUAL ENTRY ASSISTANT USING AUTOMATED GREETER

(75) Inventors: Connie Jordan, San Juan Capistrano, CA (US); Kenneth S. Bailey, Newport Beach, CA (US); Christopher Carmichael, Laguna Miguel, CA (US)

(73) Assignee: UBIQUITY Holdings, Inc., Irvine, CA (US)

( * ) Notice: Subject to any disclaimer, the term of this patent is extended or adjusted under 35 U.S.C. 154(b) by 933 days.

(21) Appl. No.: 11/859,054

(22) Filed: Sep. 21, 2007

(65) Prior Publication Data

US 2008/0130956 A1 Jun. 5, 2008

Related U.S. Application Data

(60) Provisional application No. 60/846,159, filed on Sep. 21, 2006.

(51) Int. Cl.

| | |
|---|---|
| ***G05B 19/00*** | (2006.01) |
| ***H04M 3/42*** | (2006.01) |
| ***H04M 1/64*** | (2006.01) |

(52) U.S. Cl. ........ 340/5.2; 340/5.8; 340/5.86; 340/5.82; 340/5.81; 455/415; 379/88.21

(58) Field of Classification Search .......... 340/5.2–5.86; 455/415; 382/115, 124; 381/110; 704/272, 704/273, 246, 258, 270.1; 379/88.19, 67.1, 379/88.21

See application file for complete search history.

(56) References Cited

U.S. PATENT DOCUMENTS

| | | | | |
|---|---|---|---|---|
| 6,976,269 | B1 * | 12/2005 | Avery et al. | 726/2 |
| 7,064,652 | B2 * | 6/2006 | Junqua et al. | 340/5.84 |
| 7,130,401 | B2 * | 10/2006 | Rampey et al. | 379/142.14 |
| 2005/0288820 | A1 * | 12/2005 | Wu et al. | 700/264 |

* cited by examiner

*Primary Examiner* — Benjamin C Lee
*Assistant Examiner* — Omeed Alizada
(74) *Attorney, Agent, or Firm* — Law Office of Scott C. Harris, Inc.

(57) ABSTRACT

A virtual security guard or receptionist automatically allows entry to an area by determining a user's identity and comparing that to an access list. If the user is authorized, then the user is allowed entry to the area. The receptionist can be implemented by either a sign, or by using a virtual receptionist to shows a picture selected from a media server that has many different pictures. Computer intelligence can be used to allow the receptionist to carry out almost any operation that is carried out by a real receptionist.

16 Claims, 4 Drawing Sheets

VIRTUAL ENTRY ASSISTANT USING AUTOMATED GREETER

This application claims priority from provisional application No. 60/846,159, filed Sep. 21, 2006, the disclosure of which is herewith incorporated by reference.

BACKGROUND

Controlling access to a business office often requires a dedicated person, such as a receptionist or security guard to allow the person in and out of the office. Such a person, however, becomes part of the office's overhead expense.

SUMMARY

The present application teaches a system that allows outsiders access to a specific building office warehouse or home. The system uses a voice recognition module and other automated system to determine identification of persons and allow entry of the person. Another aspect may allow manual intervention from a remote location. The system can be used to act as a virtual security guard, thereby allowing those who are authorized to enter once a person has been identified.

BRIEF DESCRIPTION OF THE DRAWINGS

These and other aspects will now be described in detail with reference to the accompanying application, in which.

DETAILED DESCRIPTION

The embodiments disclosed herein allow a virtual reception capability that allows access to a secured office or other space, using an automated system.

Figure 1:
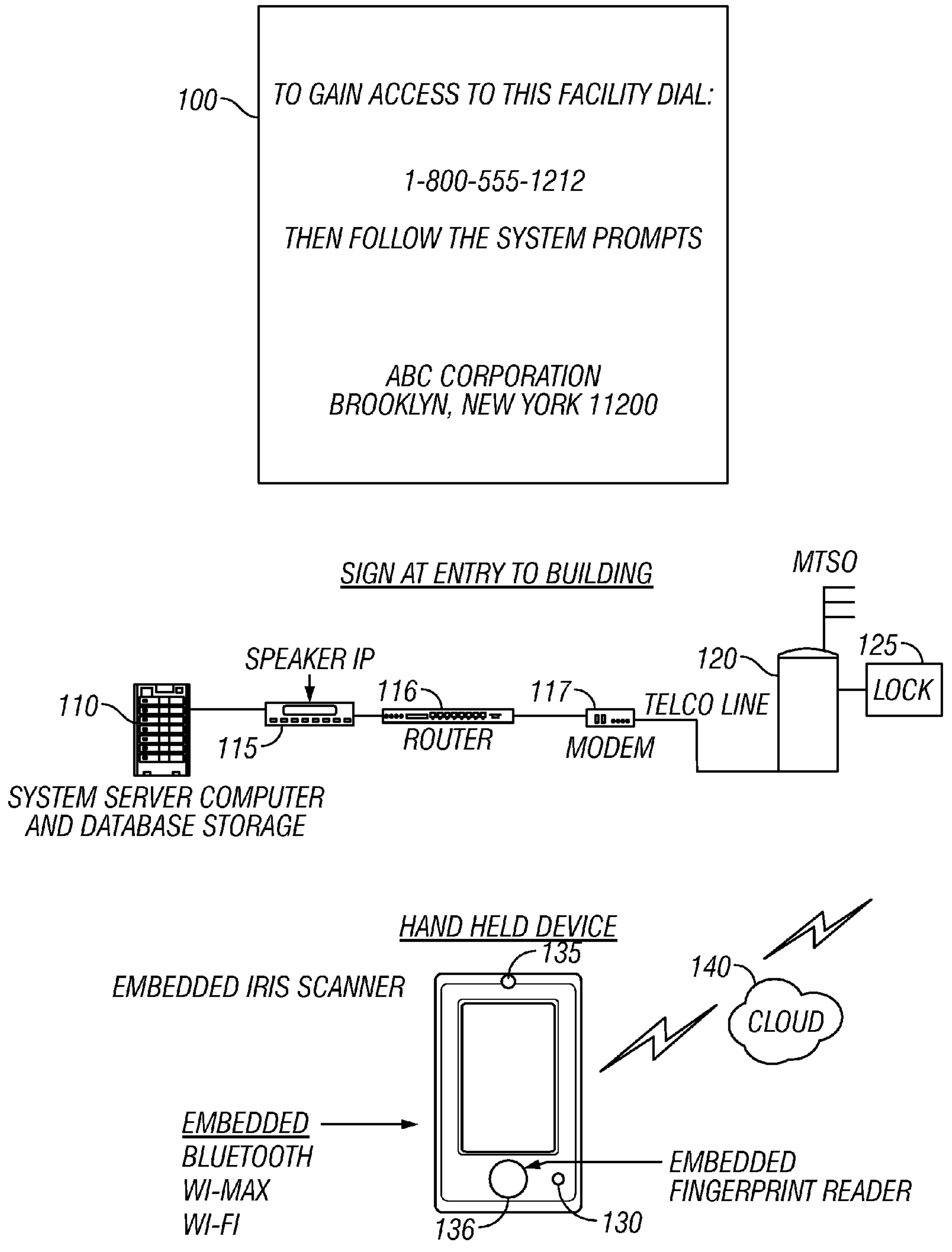
FIG. 1 shows a block diagram of an end-to-end configuration for a virtual security guard embodiment.

In operation, a person who wishes to gain access and entry arrives at the facility. FIG. 1 illustrates an instruction part 100, allowing a person to automatically enter information to dial the phone number listed on the door or window of the facility. As an alternative, a telephone can be located at the entrance, or a doorbell, and this alternative hardware can use the techniques described herein.

Initially, the entrance, e.g., a door, is locked. As explained herein, operations are taken to unlock the door when a person is properly identified.

The sign 100 is associated with hardware that is used to allow automatic entry to the building. A system computer 110 may be used to provide automated Speaker identification 115 of a spoken voice. The results of the speaker identification are sent through a router 116 and modem 117 to the automated opening device 120 which may include a connection to a solenoid 125 that controls opening of the door. In addition or alternatively, handheld device 130 can be used. This device may have an embedded iris scanner shown as 135, and may also have implemented Bluetooth, Wimax and/or WiFi. It may also or alternatively have a fingerprint reader 136. Since many laptops already include a fingerprint reader, a laptop can be used for this purpose. For example, a laptop with fingerprint reader can be placed in a location where it is accessible only via a finger, e.g. where there is a hole in a window through which a user's finger can be placed therein.

The handheld device can alternatively be a cell phone. All of this is connected via a wireless connection 142 in the automated opening device 120.

In one embodiment, an automated computer reads the caller ID from the caller's cellular phone, and finds a number from which the caller is calling. After finding this, the system prompts the person to state their name. A voice recognition module may recognize this name by comparing the caller's voice to a voiceprint that has been previously stored. If the phone number as well as voiceprint matches, then access is granted. According to an alternative embodiment, an on-premises telephone can simply be used, in which the user picks up the telephone, and states their name. If the user has permanent access to the facility, or if the user has been enrolled for an appointment, their name and voice print will be on filed in the computer 110. Both the name and voiceprint must be recognized and accepted before the person will be allowed to enter.

In yet another embodiment, a face recognition module can be used.

An advantage of this system is that it saves on the not-insubstantial costs of hiring an actual receptionist and/or security guard.

In this embodiment, the handheld cellular device allows recognition, which is also confirmed using voice recognition. Alternatively, the visitor can use any wireless device, such as a Bluetooth enabled device, Wimax or WiFi. The system may allow access based on caller ID plus one other biometric trait. For example, the other trait may include one additional proof of identification such as fingerprint, voiceprint, iris scan, palm geometry, wrist or veins, electronic identification systems such as passports, drivers licenses, or proximity cards. This system may allow entry based on positive identification from two or more items, making the system much more difficult to spoof.

Another system may restrict access. For example, there may be certain restricted access areas where a visitor is not authorized to enter. When the visitor attempts to enter that location, access is denied, and information is stored regarding the time, date, access points and other pertinent data regarding the access or entry permissions. Upon granting of access, the same detailed information is also logged and stored for further use.

In an embodiment, the system is connected to an electrically-operable lock, e.g., a bolt action device 125, which can open the door and allow the visitor to gain access into the facility, office or residence.

FIG. 1 illustrates display 100, which provides the user with information about a number to dial which allows entry into the area. This display says "to gain access to this facility dial:x. The display and then voice prompts, guide the callers through the different options of the entry. One important feature is that according to an embodiment, two different items must each agree prior to acceptance of a positive identification.

Figure 2:
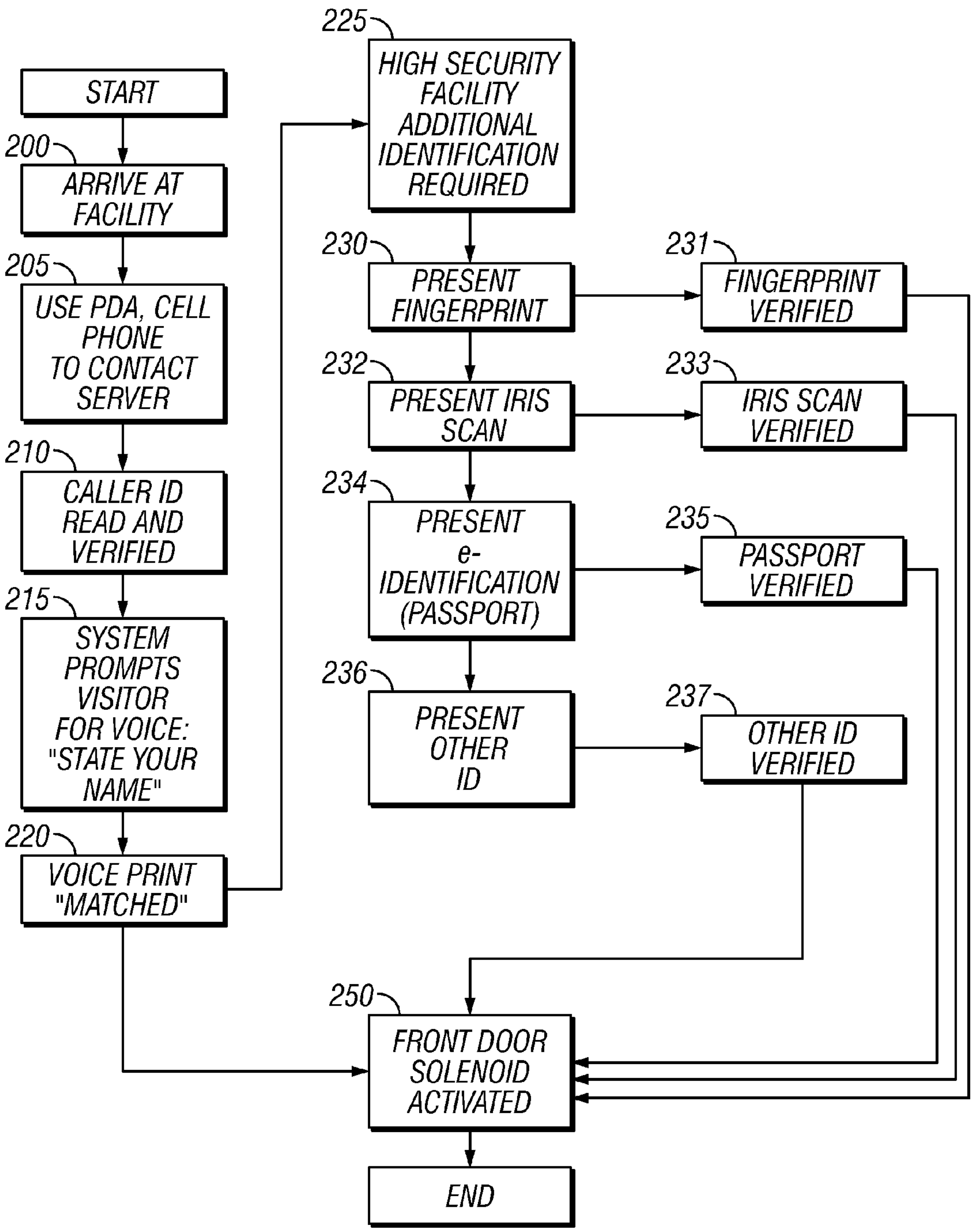
FIG. 2 shows a flowchart of operation.

FIG. 2 illustrates a flowchart of operation. At 200, a user arrives at the facility, and uses their PDA, cell phone, or the like to contact the server at 205. The caller ID is read and verified at 210, followed by the system prompting the visitor for voice at 215 for example by saying "state your name". A speaker identification module is run at 220. If both caller ID and the voiceprint matches, then the door solenoid is activated at 250, allowing the user to enter the door.

According to another embodiment, however, the device is installed at a higher security facility where additional identification is required, shown generally as 225. This may require at least one additional item of biometric security. For example, at 230, the user may present their fingerprint. The fingerprint is verified at 231, causing flow to pass to deactivate the front door solenoid. Any and/or all of the following other items may alternatively be carried out. An iris scan routine is shown at 232 which is verified at 233 and electronic identification is accepted at 234, which is verified at 235. 236 generically represents other ID, which is verified at 237. If any of two or more of these are verified, the door solenoid is activated at 250.

The present system may be used for factory security, home security, office security, automobile security, military and defense security, and aircraft security, for example.

Figure 3:
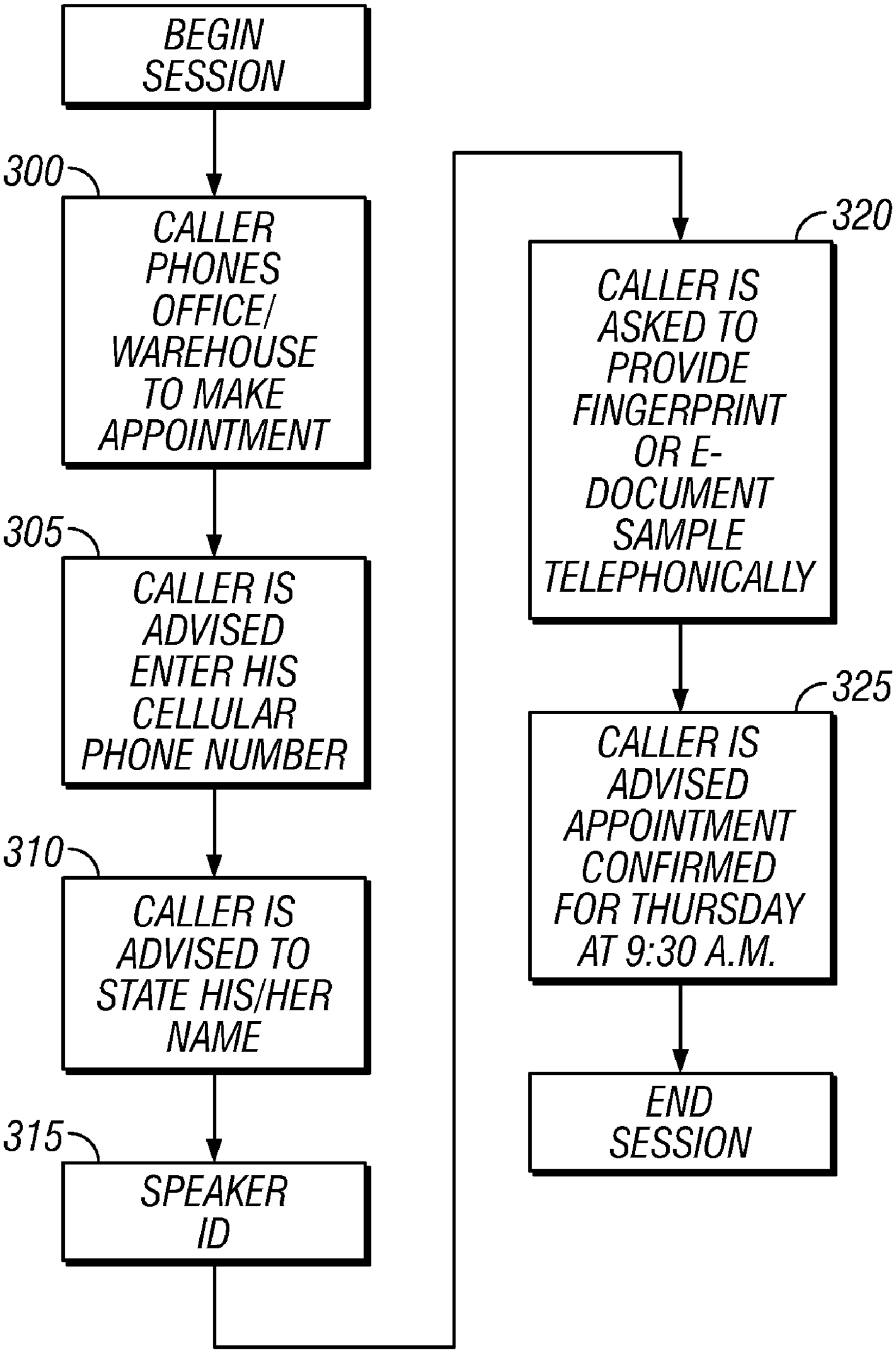
FIG. 3 shows a registration flowchart.
Figure 4:
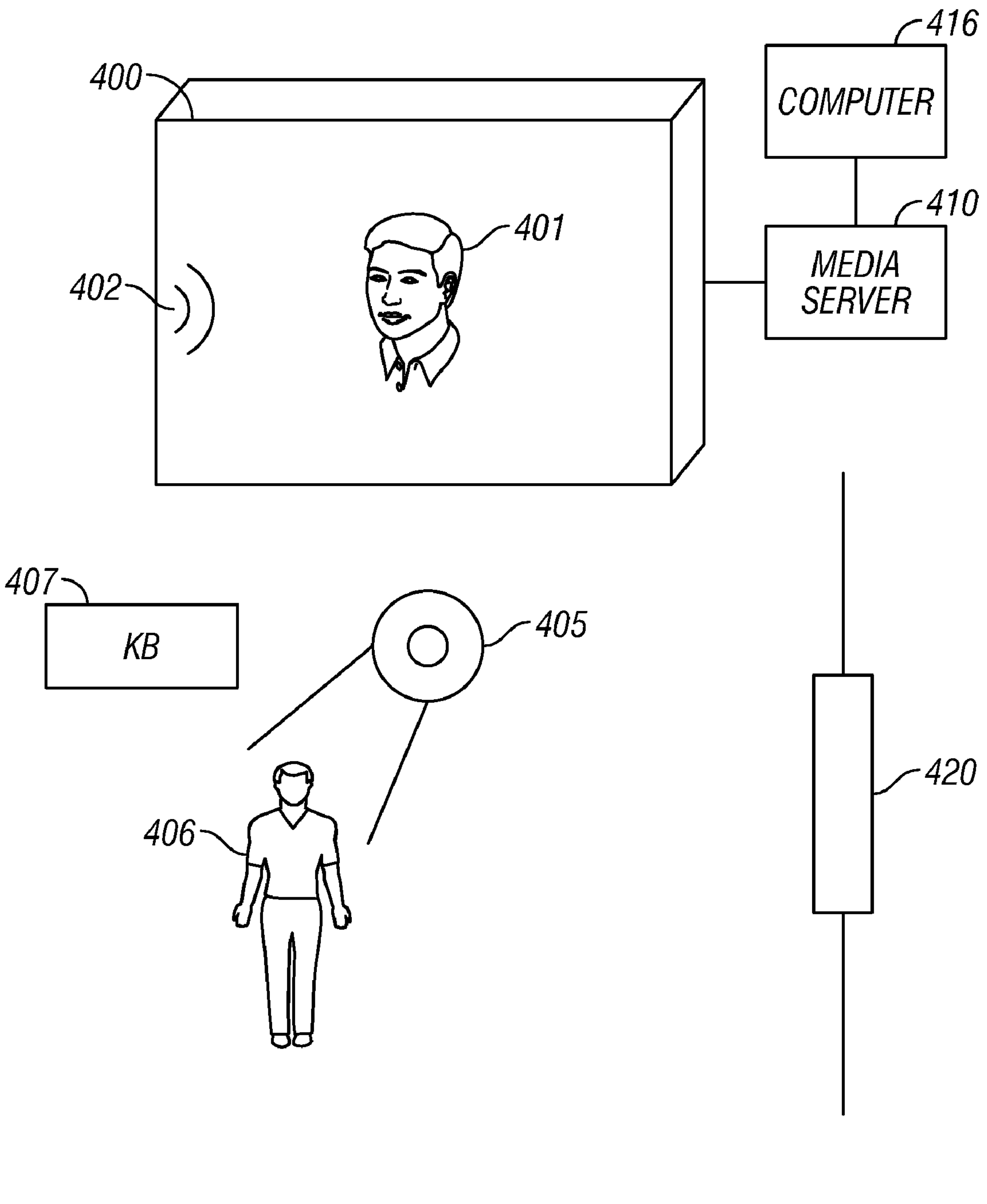
FIG. 4 shows another embodiment which uses a virtual receptionist.

FIG. 3 illustrates an example of the enrollment process which can be carried out according to this system. At 300, the caller phones in order to make an appointment. This begins the operation of enrolling for the virtual security guard operation, which is later used to allow automatic entry to the person when they arrive for the appointment. After making the appointment, the routine begins running at 305, where the caller is advised to enter their cellular telephone number. As an alternative, the cellular telephone number can be automatically determined by caller ID. At 310, the caller is asked to state their name, and 315 asks the caller to repeat a specified phrase from which speaker identification can be carried out. In addition to or alternately to 315, the caller can be asked for some kind of personal information such as an electronic fingerprint, electronic document sample, signature, personal information of some other type, or the like. 325 represents an acceptance, whereby the caller is advised that their appointment is confirmed. This enrolls the caller's information on the computer 110, allowing the caller to later visit for an appointment.

According to another embodiment, the virtual security guard is like a virtual receptionist. In this embodiment, the user arrives in a room which is secured against vandalism and theft and the like. For example, all of the electronics may be securely attached and/or behind theft prevention mechanisms such as plexiglass cages. The room that includes these materials may be like a reception area, however all the doors are locked as in the above embodiment. A screen 400 shows an image of a virtual receptionist 401. A speaker 402 is associated with the screen. For example, the screen may be a flatscreen TV of some type such as a plasma TV. A camera 405 is also located in the room, and the camera takes a picture or video of the visitor generically shown as 406.

The screen is driven by a media server 410, which has different types of virtual receptionists. For example, the receptionist such as 401 can be animated receptionist, based on a model of a computer-based animation. It can be a real animation, or simply a still image. In any case, a media server 410 may store a number of different faces of individuals, male and female, and a number of different voices.

The face can be, for example, changed each time the user 406 asks a question or says a word. The face can also be morphed between different faces, or changed in some other way to provide interest to a watching user.

The virtual receptionist 401 can do many things that are done by a normal receptionist. For example, the receptionist 401 can ask questions like "who are you here to see?". The user 406 answers, and the receptionist recognizes the voice and calls that person. The person can view their visitor, and can remotely allow their visitor to enter, e.g, by entering a specified code to allow the user 406 entry through the locked doorway 420. If the person is not there, then the system can for example allow the user to request that they be paged, and informed to leave a message for the person.

The media server 410 can also store a number of different languages, for example. The user can select any of the languages with which to communicate with the automated machine. In essence, therefore, this becomes a multilingual receptionist.

A controlling computer 415 may be connected to the media server 410, and may provide additional control over the operation. For example, words spoken by the user 406 may be speaker-independently voice recognized, to attempt to identify the name that is entered. As an alternative, a manual user interface, such as a keyboard 407 can be located in the area, allowing the user to enter their name. The computer 415 may store a list of allowable visitors, for example the names of the visitors who are allowed to enter on that date. In this way, the system can prevent entry to solicitors and salespersons.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the virtual receptionist can do other things, such as asking the visitor if they want a refreshment, and providing one by controlling an electrically operable machine.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:

using an automated machine to prompt a user to identify themselves by indicating a specified telephone number to dial using the user's portable telephone;

first using said automated machine for verifying a caller ID of the user calling said specified telephone number to determine first user information;

obtaining a biometric feature of said user as second user information in said automated machine, and second verifying said biometric feature;

only if verifying both said first user information and said second user information as belonging to a same user, said automated machine comparing information about said same user, to a list of approved users; and only if said comparing has said same user on said list of approved users, said automated machine electronically operating an entry door latch to allow user entry to a facility;

wherein said obtaining said biometric feature comprises receiving information indicative of the biometric feature from the user's portable telephone that provides said caller ID.

2. A method as in claim 1, wherein said biometric feature is a fingerprint obtained from a fingerprint reader.

3. A method as in claim 1, wherein said biometric feature is via speaker recognition.

4. A method as in claim 1, wherein said using comprises providing a display to a user and providing said prompt to the user, wherein said prompt includes a telephone number to dial.

5. A method as in claim 4, wherein said display includes a face of a simulated receptionist.

6. A method as in claim 5, further comprising a media server storing information indicative of a plurality of faces and a plurality of voices of plural different virtual receptionists.

7. A method as in claim 1, comprising controlling a user to enroll on said list of approved users at a time of making an appointment, and wherein said comparing and verifying comprise comparing a user's name to a name enrolled at said time of making the appointment and said operating is only carried out if said verifying determines said user's name is on said list of approved users.

8. A method as in claim 1, further comprising controlling a user to select one of a plurality of languages with which to communicate with the automated machine and said using comprises communicating in said selected language.

9. A system, comprising:

an operating computer, which includes information indicative of plural different faces and voices and also includes structure which controls said faces and voices to provide information to a user indicative of entry to a facility, wherein said information provided to the user includes at least a request for first information that includes identifying information from the user, including at least a telephone number which the user should call, and a biometric information piece from the user, and wherein said computer also has a capability of receiving information from the user, and receives a caller ID from the user and verifies said caller ID against a list of authorized caller IDs, receives information indicative of a biometric feature of the user and compares the biometric feature against a list of authorized biometric features, and only if verifying both said authorized caller ID and said biometric feature, then taking an action to allow entry of a user to a stored facility based on said comparing, wherein said operating computer receives both said caller ID and said biometric information from a same portable device whose caller ID is received.

10. A system as in claim 9, wherein said taking an action comprises automatically opening an electrically-operable lock.

11. A system as in claim 9, wherein said operating computer changes said faces and voices at specified times while communicating with a user.

12. A method, comprising:

using an automated computer to communicate with a visitor by receiving language information from the visitor and setting a language of communication based on said language information that is received from the visitor, and allowing the visitor to communicate with the computer in any of a plurality of different languages;

receiving information indicative of the visitor's name and at least one verifying information about the visitor;

using said automated computer for comparing the name with a prestored list of names on an entry device that has a list of authorized entrants;

responsive to said comparing indicating that the name exists on said list, and also that said verifying information verifies that the visitor is the person on said list, and also responsive to obtaining a caller ID from a user's portable device, and obtaining a biometric feature from the same user's portable device that provides said caller ID, using said automated computer for automatically opening an entry device to allow the visitor access to a secured area.

13. A method as in claim 12, wherein said verifying information includes voiceprint recognition.

14. A method as in claim 12, wherein said using comprises providing a face of a simulated receptionist, during a time of speaking from the computer to the person.

15. A method as in claim 14, further comprising providing faces of different simulated receptionists, and changing said faces.

16. A method as in claim 15, wherein said faces are changed during a time of talking to the visitor.

* * * * *